United States Patent
Wallner (10) Patent No.: US 8,182,605 B2
(45) Date of Patent: *May 22, 2012

(54) CEMENTITIOUS VENEER AND LAMINATE MATERIAL INCORPORATING REINFORCING FIBERS

(75) Inventor: Christine E. Wallner, Berkeley, CA (US)

(73) Assignee: Ecomeld Corp., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/778,999

(22) Filed: May 12, 2010

(65) Prior Publication Data

US 2010/0222457 A1    Sep. 2, 2010

Related U.S. Application Data

(60) Continuation-in-part of application No. 12/146,237, filed on Jun. 25, 2008, now Pat. No. 7,740,700, and a continuation of application No. 11/091,648, filed on Mar. 28, 2005, now Pat. No. 7,407,545, and a division of application No. 10/330,767, filed on Dec. 27, 2002, now Pat. No. 6,913,819.

(51) Int. Cl.
*C04B 11/00*    (2006.01)

(52) U.S. Cl. ........ 106/685; 106/686; 106/705; 106/772; 106/778; 106/DIG. 1; 428/325

(58) Field of Classification Search .................. 106/685, 106/686, 705, 772, 778, DIG. 1; 428/325

See application file for complete search history.

(56) References Cited

U.S. PATENT DOCUMENTS

| | | | |
|---|---|---|---|
| 3,592,724 A | 7/1971 | King et al. | |
| 3,853,571 A | 12/1974 | Gelbman | |
| 3,960,580 A | 6/1976 | Stierli et al. | |
| 4,084,982 A | 4/1978 | Prior et al. | |
| 4,158,570 A | 6/1979 | Irwin | |
| 4,400,413 A | 8/1983 | Emmons et al. | |
| 4,504,320 A | 3/1985 | Rizer et al. | |
| 4,746,365 A | 5/1988 | Babcock et al. | |
| 4,801,630 A | 1/1989 | Chow et al. | |
| 4,849,018 A | 7/1989 | Babcock et al. | |
| 5,328,507 A | 7/1994 | Crocker | |
| 5,391,245 A | 2/1995 | Turner | |
| 5,401,798 A | 3/1995 | Rasp et al. | |
| 5,424,099 A | 6/1995 | Stewart et al. | |

(Continued)

FOREIGN PATENT DOCUMENTS

GB    2262521 A    6/1993

*Primary Examiner* — Paul Marcantoni (74) *Attorney, Agent, or Firm* — Dergosits & Noah LLP; Geoffrey T. Staniford (57) ABSTRACT

A cementitious veneer and laminate composition is provided. The cementitious laminate composition includes a substrate, a primer layer applied to the substrate, the primer layer comprising a mixture of polyvinyl alcohol catalyst, Portland cement, and sand; and a cementitious veneer layer applied to the primer layer, the cementitious veneer layer comprising a mixture of magnesium sulfate, filler, magnesium oxide, gypsum cement or bassanite, cellulose ethers, and polyvinyl alcohol catalyst. The polyvinyl alcohol catalyst comprises a mixture of polyvinyl alcohol fibers dissolved in water and mixed with butylene carbonate. The veneer layer is applied to the substrate and primer layer by means including spraying and manual spreading, and can be ornamentally manipulated either before or after curing of the veneer layer. The veneer composition can be formed into laminated tiles or panels for use in building applications.

20 Claims, 3 Drawing Sheets

U.S. PATENT DOCUMENTS

| | | |
|---|---|---|
| 5,447,752 A | 9/1995 | Cobb |
| 5,465,544 A | 11/1995 | Ghahary |
| 5,502,941 A | 4/1996 | Zember et al. |
| 5,718,759 A | 2/1998 | Stav et al. |
| 5,795,380 A | 8/1998 | Billings et al. |
| 6,913,819 B2 * | 7/2005 | Wallner ........................ 428/325 |
| 7,407,545 B2 * | 8/2008 | Wallner ........................ 106/685 |
| 7,740,700 B2 * | 6/2010 | Wallner ........................ 106/685 |

* cited by examiner

CEMENTITIOUS VENEER AND LAMINATE MATERIAL INCORPORATING REINFORCING FIBERS

CROSS-REFERENCE TO RELATED APPLICATIONS

The present application is a Continuation-in-Part application of currently patent application Ser. No. 12/146,237, filed on Jun. 25, 2008, and entitled "Cementitious Veneer and Laminate Material", which is a Continuation Application of Ser. No. 11/091,648, filed on Mar. 28, 2005, and entitled "Cementitious Veneer and Laminate Material", now issued as U.S. Pat. No. 7,407,545, which is a Divisional application of Patent application Ser. No. 10/330,767, filed on Dec. 27, 2002, entitled "Cementitious Veneer and Laminate Material", now issued as U.S. Pat. No. 6,913,819.

FIELD OF THE INVENTION

The present invention relates to decorative surface coatings and, more particularly, to durable surface coatings that incorporate a cementitious veneer.

DESCRIPTION OF RELATED ART

Traditional building materials, such as stone, cement, brick, and tile objects have long been valued for both their structural integrity and aesthetic appearance. Since these materials are typically heavy and cumbersome, special measures must often be undertaken to ensure that objects and structures made of such materials are properly supported. Unfortunately, not all existing buildings or other structures are capable of bearing the weight of such objects. Indeed, costly reinforced frames, reinforced flooring, and so on, are frequently required to ensure such support. In some cases, these structures may impose very significant costs and require overly complicated building techniques.

In addition, the material cost of stone, cement, brick, and tile (hereinafter collectively referred to as "masonry") can be expensive. Consequently, economical lighter weight surface coatings that simulate the appearance of masonry have been used to enhance the appearance of both utilitarian and decorative objects.

Figure 1:
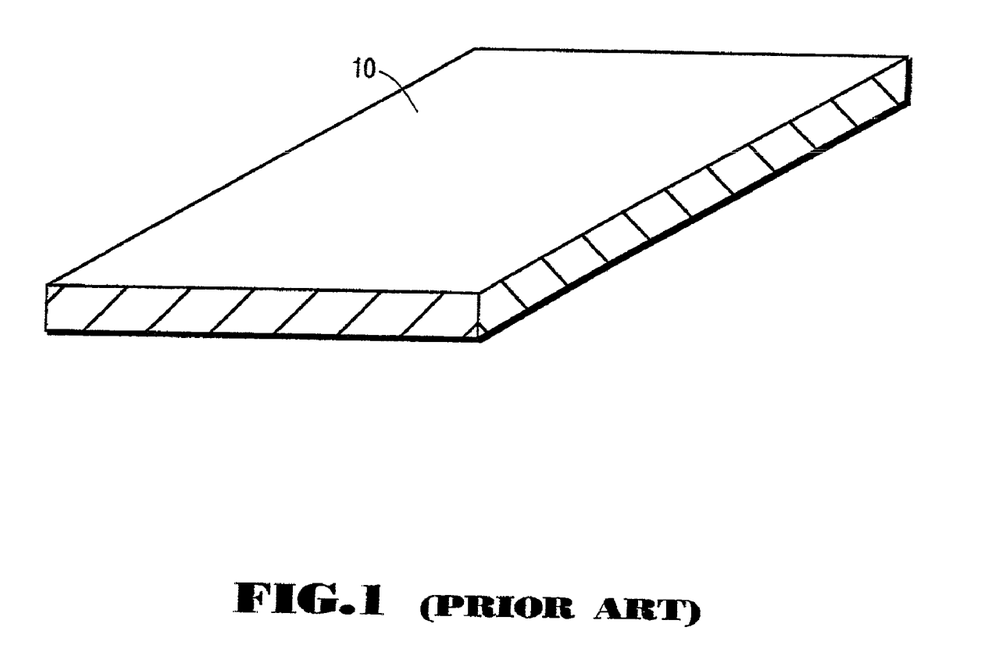
FIG. 1 is a perspective view of an uncoated substrate surface according to the prior art.

FIG. 1 is a perspective view of an uncoated surface 10 according to the prior art. It is well known in the prior art to apply a surface coating or covering to such a surface, for both structural and aesthetic purposes. Examples of common surface coatings that have been made to simulate the appearance of masonry include vinyl coverings, fabrics, paints, plaster, plastics (e.g., Corian™), and other manufactured materials, such as Formica™. Generally, however, these materials have various disadvantages. Vinyl floor and wall coverings usually provide a rubbery appearance and are typically recognizable as imitations. Fabrics and paint may be printed or applied in such manner to give a superficial appearance of masonry, but since these materials are quite different as compared to masonry, they are also often easily detectable as imitations. Moreover, fabrics and paint are relatively delicate and do not withstand a great deal of wear and tear. Plaster may provide a better approximation of masonry than the above materials, but plaster is relatively soft, lacks durability and is subject to chipping and cracking. Sheet rock, plaster and gypsum products are also susceptible to black mold growth that often results when the paper backing used for such wallboard products comes into prolonged contact with water or moisture.

The search for lightweight durable materials that give the appearance of masonry has lead to the development of masonry-like coatings that may be applied to suitable foundation materials such as wood, metal, cement fiber boards, or polymeric objects. For example, a method and apparatus for producing an ornamental concrete surface is described in U.S. Pat. No. 5,502,941. As described therein, an ornamental coating which appears as brick or flagstone may consist of a waterproof sub-base of epoxy resin and an elastomeric sealant covered with fiberglass webbing. A first mortar layer of cement, sand, color pigment and aqueous solution of adhesive resin is then sprayed or troweled on. When the first layer cures, a template having a pattern of grout lines is placed over the first layer and a second mortar layer having the same composition as the first layer is applied except that a contrasting color is used to give the appearance of grouted brick or flagstones. The ratio of cement to sand is given as fifty-fifty with solution of acrylic resin varying from one and one-half to two gallons per 46 pounds bag of dry cement/sand mix.

In U.S. Pat. No. 5,447,752, a method is described for making a decorative cementitious pattern on a surface. The surface coating composition is described as comprising cement, sand, a polymer binder, and water. The binder is an acrylic latex polymer, such as styrene butadiene in water. Cement is mixed with sand (30%-40% cement) to form a mixture which is combined with the binder solution in an amount ranging from two to three gallons binder solution to 100 pounds cement/sand. The preexisting surface is etched with muriatic acid, brushed and spray washed. A template having a desired pattern is placed on the surface and a layer of the surface coating composition is applied into openings in the template by spraying or by manual spreading.

U.S. Pat. No. 3,592,724 describes a cementitious laminate of sulfonated polymers useful for making walls, floors, ceilings and plasterboards having improved water vapor impermeability. As described therein, the laminates consist essentially of a surface sulfonated water insoluble resinous film and an inorganic cementitious material adhering to at least one surface of the film. In one aspect, hydraulic cement is plastered on a wall and sulfonated film is adhered to the plastered wall. The laminated wall may be finished with a coat of gypsum plaster.

In general, present known techniques for producing cementitious laminates present certain disadvantages. These include expensive and complicated processes, and/or the production of laminates that are heavy and difficult to use and install. A further disadvantage of present techniques is that the laminates produced do not feature surfaces that are sufficiently scratch-resistant, fireproof, or water resistant enough for many industrial or home use environments. Also, available thin cement or concrete veneers are inherently brittle due to the use of relatively large-size aggregates; the use of polymers to counteract the problem of brittleness and cracking due to these aggregates often results in a veneer that is overly plastic or resin-like in appearance. A yet further disadvantage associated with present cement and concrete manufacturing methods is that they are generally very polluting and impose a significant impact on the environment.

It is therefore desirable to provide a process that produces economical lightweight and durable coatings, which can be used to simulate the appearance and function of masonry.

It is further desirable to produce cementitious laminates and veneers that utilize inexpensive and preferably recycled materials that satisfy present environmental and sustainability concerns.

It is yet further desirable to produce a cementitious veneer that features the use of structural fibers to increase strength and scratch resistant properties of thin cement veneers.

SUMMARY OF THE INVENTION

A cementitious laminate composition, and method of manufacturing the composition are provided. The cementitious laminate composition includes a substrate, a primer layer applied to the substrate, and a veneer layer over the primer. The primer layer comprises a mixture of polyvinyl alcohol catalyst, Portland cement, and sand. A veneer layer is applied to the primer layer, and comprises a mixture of magnesium sulfate, Fillite, magnesium oxide, calcium sulfate hemihydrate (Bassanite), a polyvinyl alcohol catalyst, and a methyl cellulose compound to impart certain binding and protective qualities to the veneer. The polyvinyl alcohol catalyst in the primer and veneer layers comprises a mixture of polyvinyl alcohol fibers dissolved in water and mixed with butylene carbonate. The primer layer is applied to the substrate to provide an adhesive surface that bonds the veneer layer to the substrate. The veneer layer is applied to the substrate and primer layer by means including spraying and manual spreading. The veneer layer also includes one or more types of fibers, such as polyvinyl alcohol fibers to increase strength. The cementitious laminate composition can be provided as a kit including the substances used to form the primer and veneer layers. The veneer composition can be formed into laminated tiles or panels for use in building applications.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments of the present invention provide a cementitious, masonry-like veneer surface that is economical, lightweight, highly durable and versatile. The cementitious veneer can be readily provided in a variety of colors and textures. In addition, it can also be shaped, molded, sanded and/or polished to achieve many desired appearances.

Embodiments of the invention also provide an accurate simulation of the appearance, feel and durability of natural masonry. The cementitious veneer of the present invention has sufficient strength to resist chipping, gouging and cracking, but is light enough to cover desired objects without requiring additional support. In addition, the cementitious veneer described herein features advantageous heat and water resistance characteristics, making it suitable for use in a variety of different building and finishing applications. When applied directly to a wall or similar structure, the cementitious veneer can increase the shear strength of the wall or structure.

In a preferred embodiment, the cementitious laminate material described herein comprises a substrate layer coated with an adhesion or primer layer, onto which is applied a cementitious veneer layer. The substrate provides a firm backing structure for the cementitious veneer, and the adhesion layer helps adhere the cementitious veneer layer to the substrate. The cementitious veneer layer comprises the outer layer of the cementitious laminate material that features the appearance of a natural masonry material.

Substrate Layer

Figure 2:
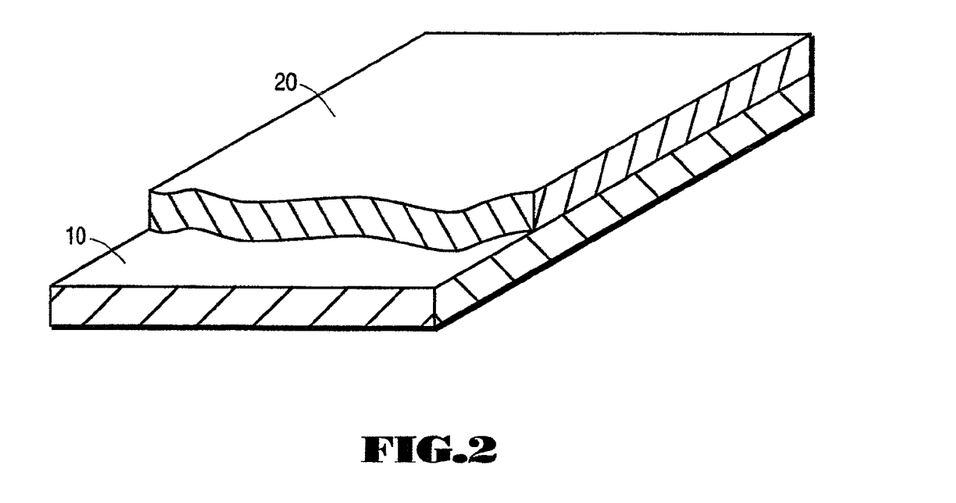
FIG. 2 is a perspective view of a substrate surface coated with a primer layer for a cementitious laminate according to one embodiment of the invention.

The cementitious veneer can be applied to cover any appropriate underlying surface on which a masonry-like finish is desired. The underlying support surface comprises a substrate, which serves as the base building material upon which first (primer) and second (cementitious veneer) layers are placed, and in general can be of any shape, such as flat or curved. For optimum results, the substrate should be a stiff, non-breathable material. FIG. 2 illustrates a substrate layer 10 upon which a first layer 20 is applied.

In a preferred embodiment of the present invention, the substrate 10 comprises a honeycomb structural cardboard, such as Hexacomb™ made by Pactiv Corporation. This provides the desired characteristics of lightness, flexibility, strength, and easy installation. Depending upon the honeycomb size, the strength rating of this substrate can range from 8 psi (pounds per square inch) to 60 psi. Other fiber boards can also be used for the substrate, including cement fiberboards, such as Plycem™ made by U.S. Architectural Products, Inc., and Hardi™ Backboard made by Hardi Corporation.

Other suitable substrate materials include metal, masonry, fiberglass, gypsum board, Masonite®, plastics, ceramic, cement fiber board, other types of fiber boards, and other common building materials. Wood can also be used as a substrate material, and would preferably be a non-bending hardwood that exhibits satisfactory non-breathing characteristics.

Adhesion/Primer Layer

As shown in FIG. 2, a first base layer 20 is applied to the underlying substrate surface 10. For application of this layer, the underlying substrate surface should be clean and dry. To provide an optimal bonding surface, the underlying surface can be prepared by etching or sanding. Any method of such surface preparation for bonding known to those with skill in the art may be used herein.

This first base layer 20 is an adhesion layer, also referred to as a "primer layer" or "scratch coat" that acts as an undercoating to help bond the ultimate cementitious veneer layer to the substrate. In one embodiment of the present invention, the primer layer comprises a mixture of polyvinyl alcohol (PVA) catalyst, Portland cement, and resin coated sand. The mixture is produced by combining, on a volume basis, 1.5% to 3.6% Portland cement, 68% to 75% resin coated sand, and 29% to 30% polyvinyl alcohol polymer mixed with butylene carbonate in a ratio of 16:1, respectively. The polyvinyl alcohol polymer is produced by dissolving an amount of polyvinyl alcohol fibers in water in an approximate ratio of one part PVA fibers to 16 parts water. When mixed with butylene carbonate, the polyvinyl alcohol polymer produces the polyvinyl alcohol catalyst (PVA catalyst).

An exemplary formulation which provides an illustration of the relative percentages of these ingredients in the adhesion coat layer is provided as follows:

8 oz. of polyvinyl alcohol polymer mixed 16:1 with butylene carbonate where the PVA polymer is produced by dissolving 30-40 grams of PVA fiber in 16-20 oz. of distilled water 0.40 to 0.80 oz. Portland cement (e.g., Lehigh™ Portland Cement #1 and #2) 15 to 20 oz. resin coated sand (e.g., Borden™ shell process resin coated sand)

The components of the primer layer are mixed together and applied to the substrate surface using any appropriate application means, such as brush, trowel, or spray. Depending upon the size of the batch, curing time is typically between three to five hours at room temperature. This can be reduced to one to two hours in a controlled heat environment.

The PVA polymer component of the adhesion layer can be sourced from re-constituted polyvinyl alcohol fibers dissolved in boiling water, preferably distilled water, in an approximate ratio of 16:1. Polyvinyl alcohol (PVA) is a reground fiber or waste fiber that is generally produced as a by-product in the manufacture of certain medical supplies, such as disposable hospital gowns and hospital bed sheets. As a result, it is an inexpensive material and desirable to use as a recycled material. Polyvinyl alcohol reground fiber, such as is found in the ISOLYSER line of products by Orex produced by United Cotton is an example of an appropriate source of polyvinyl alcohol fibers. Alternatively AIRVOL 125 polyvinyl alcohol can be used in similar concentrations as that of the recycled PVA fibers. PVA fiber material may also be available through Global Resources International (GRI), which specializes in healthcare products.

The PVA catalyst is produced by mixing the dissolved mixture of PVA fibers or flakes (the PVA polymer) with Jeffsol® butylene carbonate (made by Huntsman Corp.), in a ratio of 16 parts of PVA polymer to one part butylene carbonate. This serves to strengthen the PVA catalyst's molecular bond. An exemplary method of producing a sample size of the PVA catalyst is as follows: boil 16 oz. of distilled water, add 40 grams of polyvinyl alcohol fibers to the boiling water to produce the PVA polymer, allow the PVA polymer to cool and then add 10-15 cc's of butylene carbonate to the mixture. For best results, the PVA fibers should be completely or nearly completely dissolved in the water before cooling and adding of the butylene carbonate.

In an alternative embodiment, propylene carbonate can also be used either wholly or in part to replace the Jeffsol butylene carbonate. In this case, the proportion of propylene carbonate may need to be increased by about 25% over the stated amount of butylene carbonate.

As shown in the formula provided above, the primer layer also includes a small amount of Portland cement at about 2% to 3% of volume. The Portland cement decreases the slickness of the hardened adhesion coat layer. The combination of Portland cement and sand creates concrete, but in this case without much cement, to provide a rough or gritty surface.

The resin-coated sand represents an aggregate that is added to the primer/adhesion layer. When used with the PVA catalyst, resin-coated sand tends to resist absorbing the catalyst. Instead of, or in combination with the resin-coated sand, other aggregates can be used, such as perlite, pumice, vermiculate and man-made pozzalons, and fillite fly ash. Aggregates for use in accordance with the invention are exemplified by a mixture of course and fine relatively inert materials, but may also be of fairly uniform size. Other aggregates that can be used include sand, gravel, silica, glass, crushed stone such as marble, granite, feldspar, basalt, quartz, and so on. However, in a preferred embodiment, resin-coated sand, or other aggregates that exhibit water and/or oil resistance properties, such as quartz, is used.

To improve the heat dispersion properties of the cementitious veneer panel, the adhesion layer can also be impregnated with fillers like aluminum hydrate, which is a refractory cement. The aluminum hydrate is mixed with the resin-coated sand to create an adhesion layer that exhibits pronounced heat dispersion characteristics. The resin-coated sand can also be mixed with other materials, such as perlite, vermiculite, agricultural or regular pumice, or micro-fiber carbon fibers (such as Thermalgraph™ DXDX). These materials also aid in heat dispersion. If any of these optional materials is used for the adhesion layer, the amount of sand can be generally be reduced by a corresponding amount. This aids in reducing the weight of the laminate material. If perlite is used, it should first be soaked in the polyvinyl polymer composition, dried and then granulated before it is added to the adhesion layer mixture. This will reduce its tendency to absorb the PVA catalyst out of the mixture.

In an alternative embodiment of the present invention, the adhesion layer can be formed using Primus®, which is a material commercially available from Dryvit Systems, Inc. Primus® is described by the manufacturer as containing 54-62% sand, 26-28% water and 9.9-10.2% acrylic latex polymer/binder.

FIG. 2 is a perspective view of a substrate surface 10 coated with a primer layer according to the invention. The composition for forming the primer layer 20 is mixed together to form a liquid. This liquid can be applied by means including spraying or manual spreading, for example using a brush or trowel. The viscosity of the mixture is dependent upon the concentration of the polyvinyl alcohol catalyst and aggregate (e.g., resin-coated sand). The viscosity can therefore be adjusted to optimize application to the surface. For example, if application by spraying is desired, a relatively low viscosity mixture is prepared. A more viscous mixture can be prepared for manual spreading.

The primer layer mixture is applied to the underlying substrate material surface prior to curing and hardening. The mixture is then allowed to cure until hard. The mixture can be applied in amounts sufficient to form a layer having a thickness of between approximately 1/16 inch and approximately 1/2 inch, or any other desired thickness.

In an embodiment, a natural earth plaster (textured or non-textured) primer may be used. One such example is American Clay® sanded primer elite or other similar primer. Such a primer may comprise a mixture of water, marble dust, alcohol ester, phosphate, and sodium and other materials, such as aggregates (e.g., pumice) and filler.

In one embodiment of the present invention, the primer layer can include fibers, such as carbon fibers or polyvinyl alcohol fibers embedded within the layer. This increases the fire and heat resistance of the substrate depending upon the thickness of the primer layer and the quantity of added fiber material. It can also increase the strength of the substrate. For improved impact resistance characteristics, materials such as PVA, kevlar, or fiberglass can be added in fiber or mesh form to the adhesion layer.

Once dry, the primer layer provides a good adhesive surface for the second layer (cementitious veneer layer), which is composed primarily of gypsum cement (i.e., calcium sulfate).

Cementitious Veneer Layer

Figure 3:
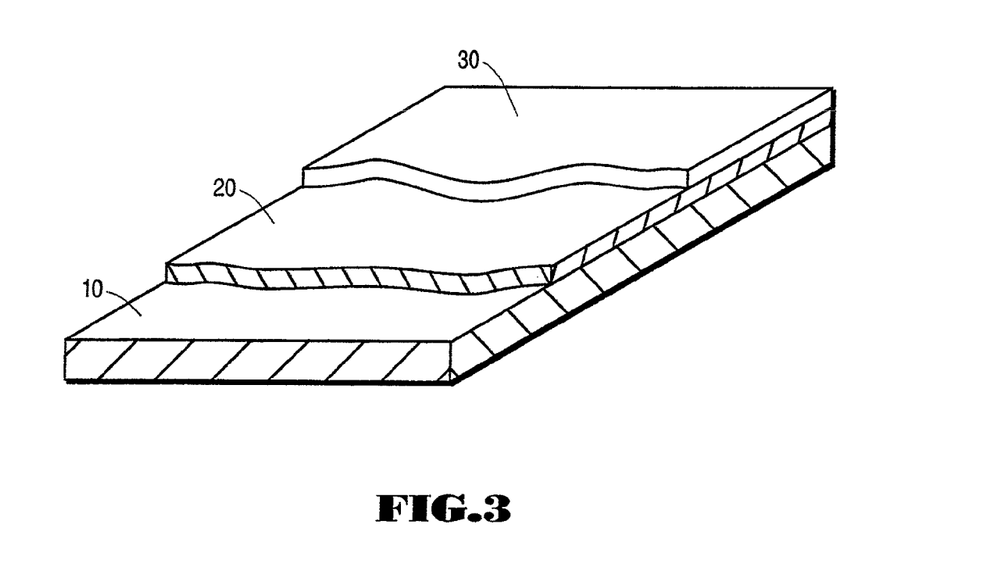
FIG. 3 is a perspective view of a decorative cementitious veneer layer applied to a primer layer and substrate according to one embodiment of the invention.

A cementitious veneer layer 30 is applied to the adhesion layer, as illustrated in FIG. 3, to form the cementitious laminate material. This veneer layer provides the look and feel of a concrete or mineral surface to the lightweight substrate. In one embodiment of the present invention, the cementitious veneer layer 30 comprises a mixture of magnesium sulfate, magnesium oxide, filler (e.g., Fillite), gypsum cement, and polyvinyl alcohol catalyst, along with other components. The two basic components of the cementitious veneer layer are a magnesium oxysulfate composition and a cementitious composition. A more detailed description of each of these two components will be provided in the description that follows.

In one embodiment, the magnesium oxysulfate (magox) composition is produced by combining, on a volume basis, 0.04% to 0.08% sodium hexametaphosphate, 0.06% to 0.17% phosphoric acid at a concentration of 75% to 85%, 47% to 54% magnesium sulfate, 30% to 35% of magnesium oxide, 1.3% to 1.4% distilled water, and 8% to 11% filler (e.g., Fillite).

An example formulation which provides an illustration of the relative percentages of these ingredients in the magnesium oxysulfate composition is provided as follows:
 0.20-0.30 oz of sodium hexametaphosphate (sodium polymetaphosphate)
 5 cc-15 cc phosphoric acid at a concentration of 75% to 85%.
 10 oz.-13 oz. magnesium sulfate (e.g., Epsom salts) in fine powder form
 3.7 oz-4 oz distilled water
 8 oz.-10 oz. magnesium oxide
 3 oz.-5 oz. filler The sodium hexametaphosphate is a chelating agent which adheres magnesium sulfate to magnesium oxide. This is preferably added to 3.7 oz of distilled water and blended at low speed for five to ten minutes. The phosphoric acid acts to dissolve and evenly disperse the sodium hexametaphosphate throughout the mixture.

As shown above, approximately 8% to 11% filler by volume is added to the magnesium oxysulfate mixture. Fillite 500™ made by Trelleborg Fillite Inc. is a preferred ingredient for the filler. For the above example mixture this would correspond to about 4.0 oz of Fillite. Fillite is an inert, hollow silicate sphere, or granular fly ash that acts as an aggregate and increases the strength and water resistance of the veneer. The addition of Fillite also tends to enhance the flow and molding characteristics of the magnesium oxysulfate mixture. The Fillite is added to the mixture until it is hydrated, and then 10 to 13 oz. of magnesium sulfate is added to the hydrated Fillite. To this mixture, about 10 oz. of magnesium oxide is added to create the final magnesium oxysulfate composition. The stated volume amounts for the ingredients are provided for illustration and as an example of a particular mixture based on relative amounts of the ingredients. Other volume amounts may be used depending upon the overall amount of material desired.

With regard to magnesium oxide, Magox™, such as that made by Hills Brothers Chemical is a suitable ingredient for use in the magnesium oxysulfate composition. Standard grade Magox is suitable, as is grade 83 WTG. When combined with the salt, this mixture assumes a liquid elastic consistency. The mixture is slowly mixed for on the order of several hours. This slow mix period is generally possible due to a relatively long curing time of the mixture. Another suitable Magox (MgO) is Baymag (calcined magnesium oxide) BM30 50-200 mesh. For the Baymag, different mesh sizes may affect the set time. Baymag 30(-70) can also be used, which also has a mesh size of 50-200.

To the above first mixture of the magnesium oxysulfate composition is added a second mixture, referred to as the "cementitious composition." The cementitious composition is produced by mixing together, by volume, 1.2% to 1.9% Fillite, 77% to 85% gypsum cement (or bassanite), 13.5% to 14% distilled water, and 1.25% to 2.5% of PVA catalyst (made by mixing 16:1 polyvinyl polymer and butylene carbonate). An example formulation that provides an illustration of the relative percentages of these ingredients in the second mixture is provided as follows:
 0.25 oz Fillite 500, prehydrated with 0.5 oz distilled water
 11 oz gypsum cement, such as Hydrostone® Super X made by U.S. Gypsum or bassanite
 1.8 oz of distilled water
 5 cc of PVA catalyst, where the PVA catalyst consists of 40 g of polyvinyl alcohol fibers boiled in 16 oz distilled water, cooled, and then mixed with 30 cc of butylene carbonate.

The cementitious composition is a polymer layer that features water resistant characteristics. The first and second mixtures are combined in the following proportions by weight, two parts first mixture (magnesium oxysulfate composition) to 3.25 parts second mixture (cementitious composition). That is, by volume, the magnesium oxysulfate composition should constitute 61.5% of the combination. In practice, the ratio of magnesium oxysulfate composition could range from 37% to 69%, but it has been found that 61.5% is an optimum ratio. The two mixtures are mixed together for 5-7 minutes at low speed to produce a semi-liquid composition that constitutes the cementitious veneer layer mixture. The cementitious veneer layer 30 can be applied to the adhesion layer 20 by common techniques such as brushing or troweling. The stated volume amounts for the ingredients for the cementitious composition are provided for illustration and as an example of a particular mixture based on relative amounts of the ingredients. Other volume amounts may be used depending upon the overall amount of material desired.

Because magnesium oxide is naturally fire-resistant, the magnesium oxysulfate within the first mixture imparts a fire-resistant characteristic to the cementitious veneer. Likewise, any water-resistant natural property of Hydrostone Super X in combination with Fillite in the second mixture imparts a useful water-resistant characteristic to the cementitious veneer. The PVA catalyst also aids in water-resistance. In an embodiment, a generic hydrated calcium sulfate compound can be used instead of Hydrostone gypsum cement. For example, bassanite ($2CaSO_4 * H_2O$), which is a white mineral consisting of hydrated calcium sulfate, and is a pseudomorph of gypsum, may be used.

In an embodiment, the veneer layer may include a methyl cellulose compound (cellulose ethers) to impart certain binding and protective qualities to the veneer. For example, water soluble, non-ionic cellulose ethers, such as Tylose® made by SE Tylose GmBH & Co. may be used. Hydroxyethyl cellulose may also be used, such as Tylose HS30000 YP2. These cellulose ethers provide thickening, pseudoplastic properties, water retention, and protective colloid effects. The cellulose ethers in the veneer layer can additionally be processed using a starch ether as a thickener. One example of such as starch thickener is Tylovis SE 7 made by SE Tylose GmBH & Co. The Tylose functions as a set retarder and acts as a water retention mechanism to slow the dispersion rate. This helps to prevent cracking of the veneer layer once it is formed, and prevents sagging of the veneer layer if applied on a vertical surface.

In general, various different aggregates or additives may be added to the cementitious veneer layer 30 to provide different functional characteristics, properties, tactile characteristics, appearance, and so on. The additives can be provided in the form of fibers, aggregates, and/or chemicals. Table 1 below illustrates some of the additives that can be used in the cementitious veneer.

TABLE 1

Cementitious Veneer Additives

| FIBERS | AGGREGATES | CHEMICALS |
|---|---|---|
| Glass Fibers 1%-35% | Poravers 1%-2% | Castile Liquid Soap 1%-3% |
| Rice Hulls 1%-2% | Slag 1%-35% | Castile Dry Soap 1%-2% |
| Comp Rice Hulls 1%-2% | Rock 1%-35% | Xypex 1%-5% |
| Buckwheat Hulls 1%-2% | Recycled Glass 1%-35% | Tylose 0.005%-0.01% |
| Wheat Hulls 1%-2 | Recycled Plastic 1%-35% | Borax 0.005%-0.01% |
| EFT Nanofibers 0.5%-1% | Pumice 1%-2% | Boric Acid 0.005%-0.01% |
| Kevlar Fibers 1%-2% | Perlite 1%-2% | |
| Stainless Steel Fibers 1%-2% | Mica Flakes 1%-2% | |
| Other Fibers 1%-2% | Grog 1%-25% | |
| Aramid Pulp 1%-2% | Tire Shavings 1%-35% | |
| | Carbide 1%-35% | |
| | Silica 1%-5% | |

% = weight by volume of cement

For the compounds listed in Table 1, the following substitutions can be made: slag as a substitute for fly ash, hemp oil as a substitute for PVA solution, and soy resin as a substitute for PVA solution. With regard to some of the listed additives: grog is a crushed fire clay, slag is glass byproduct (residue) of casting metal or iron (metal smelting), and Xypex is a waterproofing agent and concrete additive made by Xypex Chemical Corp. Other additives and substitutions may be made depending upon the desired characteristics and properties of the cementitious veneer compound.

Pigment such as an oxide powder, liquid, dyes, or paste may be added to impart a desired color to the mixture of the cementitious veneer layer 30. Any pigment compatible with cement/gypsum known to those with skill in the art may be used herein. Glow in the dark pigments may also be used. Likewise, fluorescent colors or blacklight pigments can also be used so that the veneer has a special appearance under blacklight conditions.

Manufacturing Process

As stated above, the cementitious veneer layer comprises the two main components of a magnesium oxysulfate composition and a cementitious composition.

In an embodiment, the base cementitious composition mixture is made by the following process steps:
1. Using any standard mixing device add 37 oz distilled (or micro-clustered water or Crystal Energy water) and 2.5 oz (50 cc's) phosphoric acid. Mix about 30 seconds until evenly incorporated.
2. Add 130 oz. salt and 7 oz. fillite 300 to 500 or 60 to 90 mesh slag to the above mixture and mix on low speed for one minute then medium speed for 30 seconds.
3. Add 2.5 oz Hexametaphosphate and mix at medium speed for an additional 90 seconds. Set aside.

In an embodiment, the magnesium oxide cement mixture is made by the following process steps:
1. Add 17.9 oz of the base cement mixture with 9.9 oz. Baymag 30 or Magnesium Oxide in a large mixing bowl or container. Mix on medium speed for two minutes until mixture approaches the consistency of wet sand.
2. Add 1 tablespoon of Tylose and mix for an additional two minutes on high or until the cement mixture forms into a ball. Incorporate mineral water one teaspoon at a time if mixture does not ball up after two minutes. Cement should be loose with a greasy quality but still able to be formed into a ball by hand. Set aside.

In an embodiment, the combined cement mixture is made by the following process steps:
1. Add 69 oz. distilled (or micro-clustered water or Crystal Energy) to a large mixing container. Add a set retarder (Boric Acid or Borax) in a prescribed amount dependent on the desired setting time. Mix for 30 seconds until incorporated.
2. Add 7.5 oz. polyvinyl alcohol and 7.5 oz. fillite or 60 or 90 mesh slag to the above mixture. Mix at medium speed for one minute.
3. Add the 330 oz of USG Hydrostone Super X or bassanite to the water and mix on low for 30 seconds then on medium until just incorporated.
4. Add the Magnesium Oxi-Sulfate Cement Mixture and mix on low until just incorporated. Pour into mold or use for desired purpose.

During the drying period, the surface of the cementitious veneer layer may be ornamentally manipulated by means including embossing with a template, pressing, stamping, carving, or molding.

After the cementitious veneer layer has cured it is generally finished, but if desired, it can be further finished by polishing through techniques such as wet or dry sanding. The cementitious veneer can be coated on a material which can itself be cut. The cementitious veneer layer can be cut along with the underlying material. In such case, the veneer layer generally does not chip or scratch, and any rough edges can be easily polished if desired.

In an alternative embodiment of the present invention, the distilled water used in the cementitious veneer layer can be substituted with microclustered water produced through a process described in U.S. Pat. No. 5,711,950, or as described in U.S. Pat. No. 6,033,678. Use of such water has been found to mix more thoroughly and enhance absorption among the ingredients in the cementitious veneer layer. Empirically, use of microclustered water has been found to increase the hardness of the cured cementitious veneer layer by up to 100 percent. When used in the cementitious veneer layer, plastic or ceramic mixing blade and bowls should be used when mixing microclustered water, since metal surfaces can negatively impact the crystalline structure of the microclustered water molecules.

Fibers and Additives

As stated above, the primer layer can include fibers, such as carbon fibers embedded within the layer to increase the fire and heat resistance of the substrate, as well as impact-resistance and strength. Likewise, fibers can also be added to the cementitious layer 30. In one embodiment of the present invention, fibers added to this layer consist of manufactured Zoltek ½" chopped fibers B.P. Amoco's Thermalgraph CKDX. Milled fibers, such as Panex 33 MF0200 or Thermalgraph DKDX can also be used. Poly-vinyl alcohol fibers, such as those made by Kuraray Co. can also be used, and are advantageous when used for application in concrete mixtures, and the RF350×12 mm is a preferable Kuraray fiber.

In an embodiment, the fibers added to the cementitious veneer comprise Vectran fibers, or an equivalent thermoplastic multifilament fiber. Vectran is an aromatic polyester manufactured fibre, spun from a liquid crystal polymer manufactured by Kuraray Co. The weight of the Vectran fibers in the cementitious veneer may on the order of 0.001 percent weight of the cementitious veneer composition, by volume.

In an embodiment, polyvinyl alcohol (PVA or PVOH) fibers may also be used. For PVOH fibers 7 dr×6 mm or 15 dr×8 mm are appropriate fiber sizes. The weight of the PVOH fibers may on the order of 0.001 percent weight by volume. One example of a suitable PVOH fiber is Kuralon, which is made by Kuraray Co.

Another type of fiber that can be used are cellulose-based fibers, such as nanofibrillated lyocell fibers. Lyocell is produced from purified dissolving grade wood pulp and an amine oxide solvent. An example of a suitable lyocell fiber is the type L-040-6 fiber made by EFT LLC. In general, cellulose fibers disperse well in the cementitious veneer layer.

Figure 4:
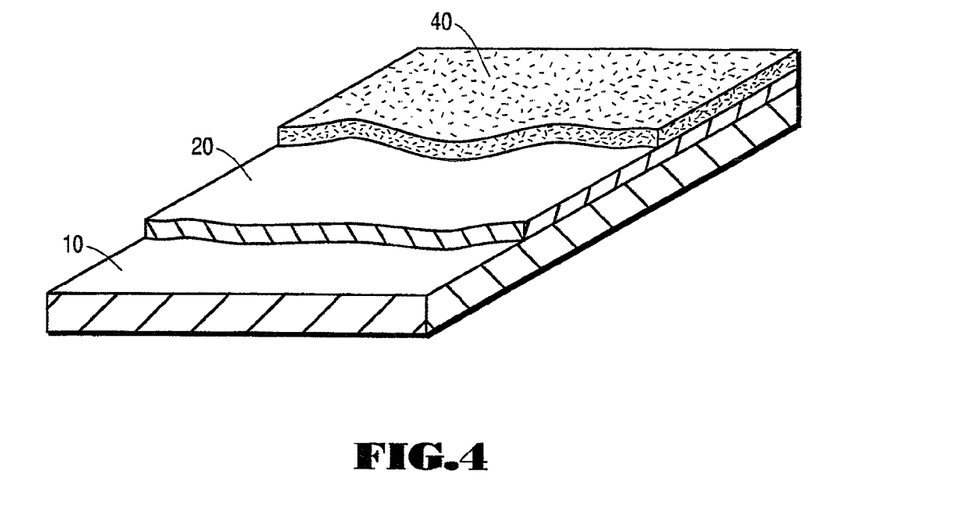
FIG. 4 is a perspective view of a decorative cementitious veneer laminate, according to a first alternative embodiment of the present invention.
Figure 5:
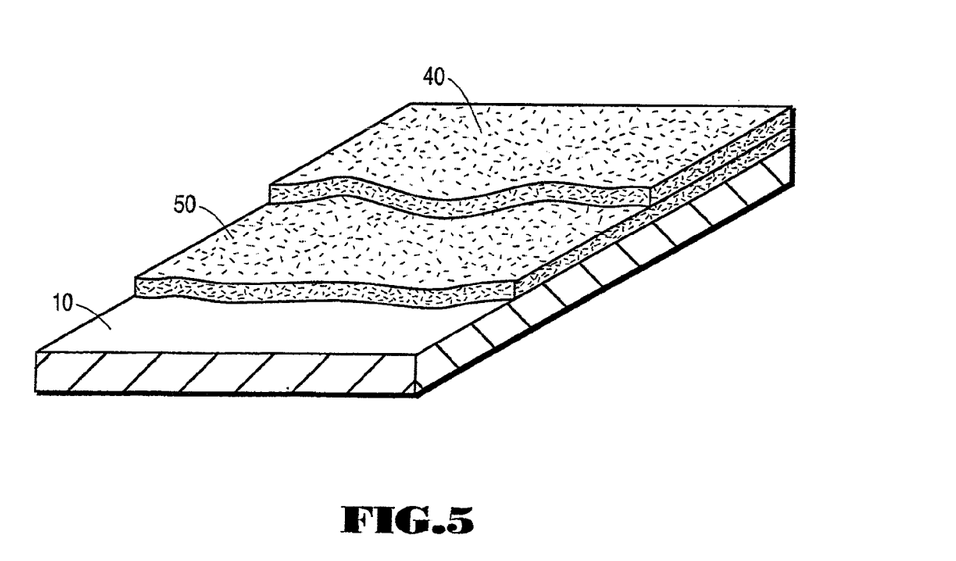
FIG. 5 is a perspective view of a decorative cementitious veneer laminate, according to a second alternative embodiment of the present invention.

FIG. 4 illustrates an embodiment of the present invention in which fibers are embedded within the cementitious veneer layer 40. The fibers may be used in their native condition, or they may treated by coloring or other effect. The surface of this layer 40 can be polished so that it is smooth, or it can be left unpolished to expose the granular pattern of the embedded fibers, as is illustrated in FIG. 4. Prior to curing, the surface of the veneer layer 40 can be made to mimic virtually any surface through casting, embossing, or other similar methods. FIG. 5 illustrates an embodiment in which fibers are embedded in both the adhesion layer 50 and the cementitious veneer layer 40. The fibers may be thermoplastic fibers, PVA fibers, cellulose fibers, carbon fibers, kevlar fibers, glass fibers, or similar types of fibers. For the percentage amounts described above, the amount of fiber used is on the order of three to seven grams. Depending on the type of fiber, different sizes and lengths may be used. For example, representative lengths for Vectran fibers are 3 mm to 6 mm, while suitable lengths for PVOH/PVA fibers are 6 mm to 8 mm, depending on use and desired characteristics.

Instead of fibers, other strengthening materials, such as hemp may be added to either or both of the primer and cementitious veneer layers. For example, industrial hemp fibers available from Kenex Corp. are suitable types of hemp. To improve mineralization of the reinforcement materials, the hemp may be dipped in a lime solution, such as slaked lime and water or alcohol. This serves to calcify the hemp fibers and improves the texture and uniformity of the cementitious veneer.

In addition to the main formula, other fillers and/or substances can be added to or substituted in varying percentages in the cementitious veneer formula to improve hardness, and water and fire resistance. For example, aluminum hydroxide is an aggregate that increases and strengthens the cement matrix of the cementitious composition and is immune to high heated temperatures. Aggregates by nature increase porability, which is also true of aluminum hydroxide. Boric acid is a mild acid that when mixed with gypsum as well as polyvinyl alcohol creates stronger compounds. Potassium aluminum is a salt, which acts as an accelerator, hardener and fireproofing aid. When these are used together they tend to cancel each other out therefore providing the benefit of both without requiring a drying time that is either too fast or too slow. The amounts recommended for the above formula for the cementitious veneer are, 0.20 to 1.00 oz. of aluminum hydroxide, 0.5 to 0.20 oz. of boric acid, and 0.5 to 20 oz. of potassium aluminum. Certain mineral aggregates, notably quartz, exhibit advantageous water and oil resistance properties, as well as ornamental properties, that may be advantageous for use in the cementitious veneer layer. A comprehensive, but not necessarily exhaustive list of additives is provided above in Table 1.

It should be understood that the embodiments and examples provided herein are for purposes of illustration of the invention. It is envisioned that those with skill in the art can make modifications to the embodiments and examples provided herein which are within the scope and spirit of the invention.

For example, while the above embodiments and examples encompass a first (primer/adhesion) layer and a second (cementitious veneer) layer, it is contemplated that more than two layers can be applied in accordance with the present invention. Additional layers of the above described base mixture can be stacked upon each other. Likewise, additional ornamental layers can be stacked upon each other. Indeed, base layers and ornamental layers can be stacked upon each other in alternating fashion.

The composition for the cementitious laminate according to embodiments of the present invention can be provided as a kit that includes the substances required to form the primer layer and the cementitious veneer layer. Such substances can be pre-mixed, or can be supplied for mixing by the user. The kit can also include containers for mixing and storing the primer layer and cementitious veneer mixtures, as well as means for applying the layers to the substrate surface, such as a trowel.

In general, panels or tiles can be formed by coating the substrate with the adhesion layer and then applying the cementitious veneer layer within a mold. The mold can be lined with textured or shaped materials to impart an ornamental appearance or functional characteristic to the cementitious veneer panel. For example, a course textured mold can impart a rough or serrated surface that aids in grip or traction for the tile. Likewise, if a glossy finish is desired, the mold can be lined with a material such as clear vellum. Placing the cementitious veneer layer in contact with the vellum during the curing step will impart a gloss to the panel. Depending upon the type of substrate material used, the cementitious laminate can also be made into sheets similar to the production of sheet rock.

In the foregoing, a method for producing a cementitious veneer and laminate has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A cementitious veneer comprising:
    a magnesium oxysulfate compound including magnesium sulfate, magnesium oxide, and sodium hexametaphosphate, phosphoric acid; and
    a cementitious composition mixed with the magnesium oxysulfate compound to form a cementitious veneer mixture, the cementitious composition including hydrated calcium sulfate, filler, cellulose ethers, a polyvinyl alcohol polymer mixture, and one or more compositionally different fibers.
2. The cementitious veneer of claim 1 wherein the polyvinyl polymer mixture comprises polyvinyl alcohol fibers boiled in water with butylene carbonate.

3. The cementitious veneer of claim 2 wherein the cementitious veneer is produced through mixing with water, and wherein the water is one of distilled water and microclustered water.

4. The cementitious veneer of claim 2 wherein the one or more compositionally different fibers are selected from the group consisting of: thermoplastic fibers, polyvinyl alcohol fibers, cellulose fibers, carbon fibers, kevlar fibers, and glass fibers.

5. The cementitious veneer of claim 2 wherein the magnesium oxysulfate compound comprises approximately sixty percent of the cementitious veneer mixture.

6. The cementitious veneer of claim 1, wherein the magnesium oxysulfate compound consists of, on a volume basis, 0.04% to 0.08% sodium hexametaphosphate, 0.06% to 0.17% phosphoric acid at a concentration of 75% to 85%, 40% to 46% magnesium sulfate, 30% to 35% magnesium oxide, 1.3% to 1.4% distilled water, 2.5% to 3.25% fly ash cenospheres, and the cementitious composition consists of, on volume basis, 1.2% to 1.9% fly ash cenospheres, 77% to 85% gypsum cement, 13.5% to 14% distilled water, and 1.25% to 2.5% of the 16:1 mixture of polyvinyl polymer and butylene carbonate.

7. The cementitious veneer of claim 1 wherein the cellulose ethers comprise hydroxyethyl cellulose.

8. The cementitious veneer of claim 7 further comprising a starch ether in combination with the hydroxyethyl cellulose during processing.

9. A cementitious veneer comprising a cementitious composition mixed with a magnesium oxysulfate compound to form a cementitious veneer mixture, the magnesium oxysulfate compound consisting of, on a volume basis, 0.04% to 0.08% sodium hexametaphosphate, 0.06% to 0.17% phosphoric acid at a concentration of 75% to 85%, 40% to 46% magnesium sulfate, 30% to 35% magnesium oxide, 1.3% to 1.4% distilled water, 2.5% to 3.25% fly ash cenospheres, and the cementitious composition consisting of fly ash cenospheres and one or more additives including cellulose ethers and one or more compositionally different fibers.

10. The cementitious veneer of claim 9 wherein the cellulose ethers comprise hydroxyethyl cellulose.

11. The cementitious veneer of claim 9 wherein the one or more compositionally different fibers are selected from the group consisting of: thermoplastic fibers, polyvinyl alcohol fibers, cellulose fibers, carbon fibers, kevlar fibers, and glass fibers.

12. A cementitious veneer made by a process comprising:
mixing magnesium sulfate, magnesium oxide, sodium hexametaphosphate, phosphoric acid together with water to form a magnesium oxysulfate compound; and
mixing hydrated calcium sulfate, filler, cellulose ethers, a polyvinyl alcohol polymer mixture, and one or more compositionally different fibers together with water to form a cementitious composition; and
combining the cementitious composition with the magnesium oxysulfate compound to form a cementitious veneer.

13. The cementitious veneer of claim 12 wherein the polyvinyl polymer mixture is produced through a process comprising boiling polyvinyl alcohol fibers in water with butylene carbonate.

14. The cementitious veneer of claim 12 wherein the one or more compositionally different fibers are selected from the group consisting of: thermoplastic fibers, polyvinyl alcohol fibers, cellulose fibers, carbon fibers, kevlar fibers, and glass fibers.

15. The cementitious veneer of claim 12 wherein the magnesium oxysulfate compound comprises approximately sixty percent of the cementitious veneer mixture.

16. The cementitious veneer of claim 12, wherein the magnesium oxysulfate compound consists of, on a volume basis, 0.04% to 0.08% sodium hexametaphosphate, 0.06% to 0.17% phosphoric acid at a concentration of 75% to 85%, 40% to 46% magnesium sulfate, 30% to 35% magnesium oxide, 1.3% to 1.4% distilled water, 2.5% to 3.25% fly ash cenospheres, and the cementitious composition consists of, on volume basis, 1.2% to 1.9% fly ash cenospheres, 77% to 85% gypsum cement, 13.5% to 14% distilled water, and 1.25% to 2.5% of the 16:1 mixture of polyvinyl polymer and butylene carbonate.

17. The cementitious veneer of claim 12 wherein the cellulose ethers comprise hydroxyethyl cellulose.

18. The cementitious veneer of claim 17 wherein the process further comprises combining a starch ether with the hydroxyethyl cellulose during processing.

19. The cementitious veneer of claim 12 wherein the process further comprises adding a dye or pigment cementitious composition to the cementitious veneer.

20. The cementitious veneer of claim 12 wherein the process further comprises forming the cementitious veneer in a mold to form tile or shaped objects.

* * * * *